United States Patent [19]
Suda

[11] Patent Number: 5,990,785
[45] Date of Patent: Nov. 23, 1999

[54] PAGER VEHICLE COMMUNICATION APPARATUS

[76] Inventor: Raymond A. Suda, 35354 Maureen Dr., Sterling Heights, Mich. 48310

[21] Appl. No.: 09/067,688

[22] Filed: Apr. 28, 1998

[51] Int. Cl.[6] .................................................. G60R 25/10
[52] U.S. Cl. .................. 340/426; 340/539; 340/825.44; 307/10.3; 379/44; 455/99
[58] Field of Search ................................ 340/426, 425.5, 340/539, 825.44; 307/10.2, 10.3, 10.4, 10.5; 379/39, 44; 455/99

[56] References Cited

U.S. PATENT DOCUMENTS

| | | | |
|---|---|---|---|
| 3,569,724 | 3/1971 | Kuehn | 290/37 |
| 4,345,554 | 8/1982 | Hildreth et al. | 123/179 BG |
| 4,962,522 | 10/1990 | Marian | 379/5 |
| 5,081,667 | 1/1992 | Drori et al. | 379/59 |
| 5,276,728 | 1/1994 | Pagliaroli et al. | 340/426 |
| 5,490,200 | 2/1996 | Snyder et al. | 379/57 |
| 5,588,038 | 12/1996 | Snyder | 379/57 |
| 5,606,307 | 2/1997 | Kuan | 340/426 |
| 5,612,578 | 3/1997 | Drew | 307/10.5 |
| 5,629,693 | 5/1997 | Janky | 340/426 |
| 5,652,564 | 7/1997 | Winbush | 340/426 |
| 5,781,101 | 7/1998 | Stephen et al. | 340/426 |
| 5,801,618 | 9/1998 | Jenkins | 340/426 |

*Primary Examiner*—Daniel J. Wu
*Assistant Examiner*—Anh La
*Attorney, Agent, or Firm*—Young & Basile, PC

[57] ABSTRACT

An apparatus for remotely communicating with the vehicle to control functional circuits in the vehicle. The apparatus includes a pager based communication apparatus mounted in the vehicle for receiving a command signal from a pager service provider in response to a user generated telephone number, security code and a command. A microcontroller is responsive to the received command and, in response to a stored control program, generates outputs to various vehicle functional circuits. The microcontroller generates outputs in response to selected user generated commands to deactivate the vehicle engine in the event of a hijack command when the engine RPM drops below a prestored engine RPM magnitude. The microcontroller is also capable of generating outputs to control engine starting and stopping, door lock and unlock operations, and other vehicle accessories.

6 Claims, 15 Drawing Sheets

PAGER VEHICLE COMMUNICATION APPARATUS

BACKGROUND OF THE INVENTION

1. Field of the Invention

The present invention relates, to remote communication apparatus for vehicles.

2. Description of the Art

It is known to provide communication devices for remotely communicating with the occupant of a vehicle. Such devices include cellular and wireless telephones as well as pagers to provide two-way communication between a central telephone service provider and each remote telephone or pager disposed within a vehicle.

At the same time, it is also known to provide remote communication with certain operable circuits or functional elements of a vehicle. For example, it is known to use a remote transmitter to transmit signals to a receiver in the vehicle for starting and/or stopping a vehicle engine. Remote communications have also been employed to control other vehicle functions, such as remote locking and unlocking of vehicle doors, trunk release, as well as flashing of the vehicle lights.

Vehicle security systems have also been devised which automatically disable an engine to prevent the engine from being started upon the detection of an intrusion event. Remote control systems have also been provided to disable or stop an operating engine in the event of a vehicle hijacking.

SUMMARY OF THE INVENTION

The present invention is a pager vehicle communication apparatus which provides remote communication between user inputs from a telephone through a pager service provider to a pager-based communication device mounted in a vehicle.

In a preferred embodiment, the apparatus comprises:

receiver means, adapted to be mounted in a vehicle, for receiving paging signals from a pager service provider in response to user commands, the paging signals including a telephone number identifying a receiver in the vehicle and a signal specifying an operation of at least one vehicle function corresponding to a user command; input means for generating signals representative of at least engine RPM, vehicle brake depression and ignition key position; and control means, executing a stored control program and responsive to the input means and the paging signals, for controlling at least one vehicle function in response to a received paging signal.

Preferably, the control means is responsive to a hijack command and the engine RPM output for stopping engine operation when the engine RPM equals or drops below a preset RPM magnitude, such as the idle RPM. The control means is also responsive to a user generated "DONE" command for immediately disabling the ignition to stop the engine operation. Preferably, the "DONE" command is valid only after an initial HIJACK command.

The control means also includes means for learning the average engine operating RPM and for setting the preset engine RPM magnitude.

The control means is also responsive to the engine RPM's output for reactivating the engine starter a predetermined number of times if the engine is not running after each sequential engine start signal.

The control means is also responsive to door lock and unlock commands for respectively locking and unlocking the vehicle doors. The apparatus also automatically locks the vehicle doors in the engine start mode.

Generally, the present invention is an apparatus for remote communications with a vehicle comprising:

telephone means for generating the telephone number, a security code and a command; means for receiving the telephone number, security code and command from the telephone means and for transmitting a signal including a pager I.D., the security code and the command; means for receiving valid commands from the transmitter means and for generating an output containing the command; control means, responsive to the command, for generating and communicating signals to the vehicle function circuits for controlling the operation of the vehicle function circuits corresponding to the command.

The pager vehicle communication apparatus of the present invention provides numerous advantages over previously devised vehicle communication devices. The pager vehicle communication apparatus of the present invention enables the vehicle engine to be safely started or stopped from any telephone throughout the world. Further, remote locking and unlocking of the vehicle doors is also provided. The apparatus is capable of learning a new security code or pin number.

According to a unique feature, the pager vehicle communication apparatus of the present invention includes an anti-hijacking feature which causes the engine to be deactivated or disabled upon a suitable user generated hijack command only when the engine RPM drops below a preset stored RPM magnitude, such as engine idle RPM. This insures that the vehicle is moving slowly enough to prevent unsafe conditions which could arise if the vehicle engine is disabled when running at a high RPM. However, a special "DONE" command is also provided for immediate disabling of the vehicle engine.

The pager vehicle communication apparatus of the present invention is also usable with any existing vehicle security system and includes means for disabling the vehicle security system when executing the engine start sequence.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
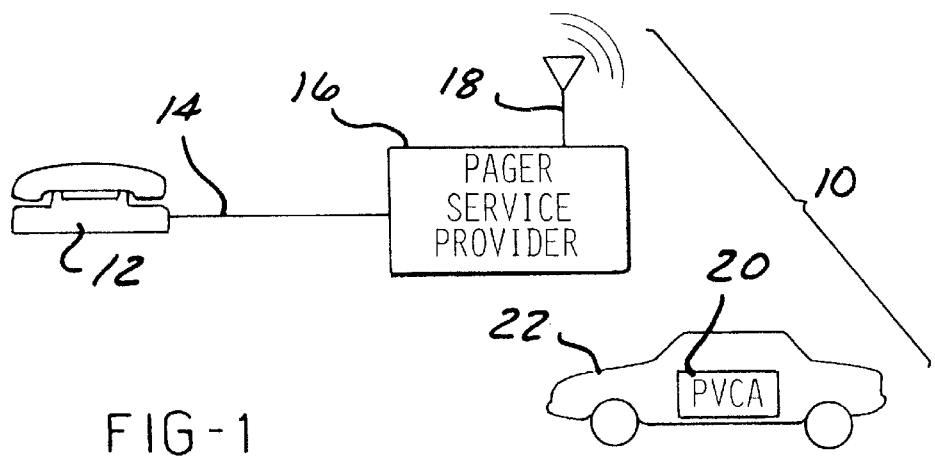
FIG. 1 is a pictorial representation of a pager vehicle communication apparatus according to the present invention.
Figure 2:
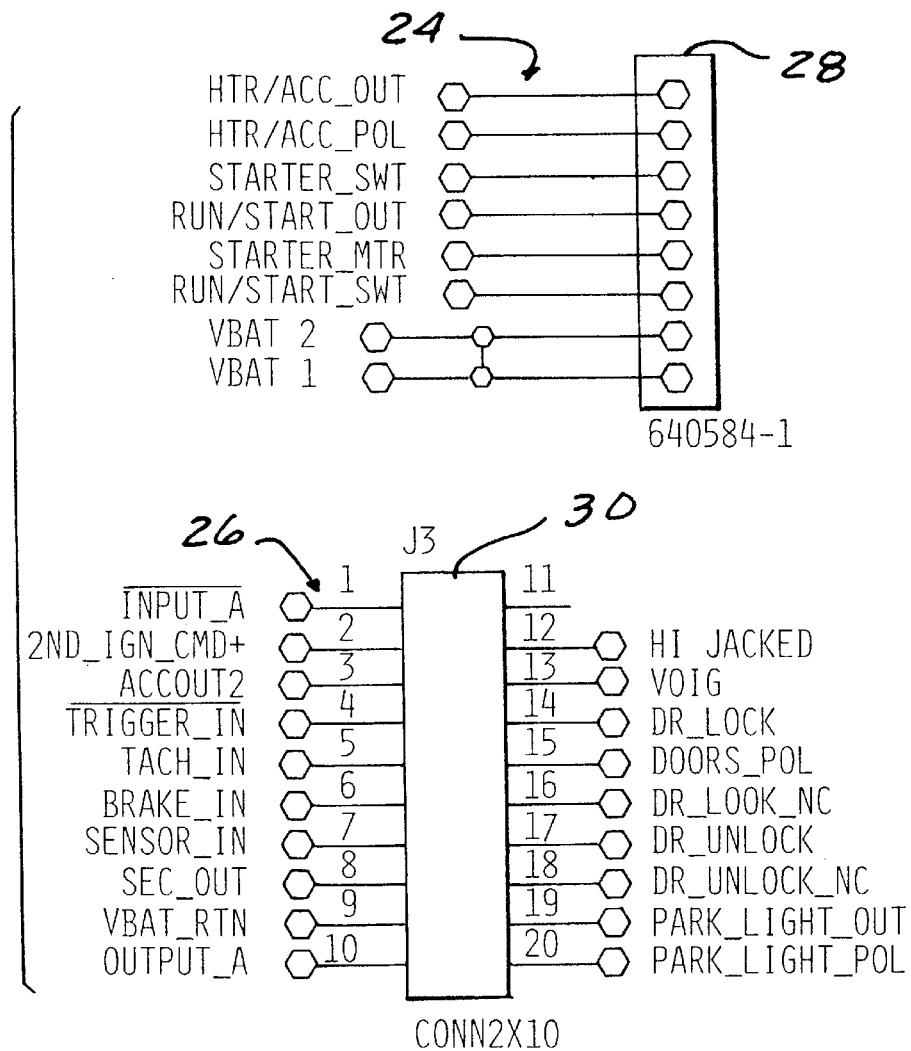
FIGS. 2–6 are schematic diagrams of the vehicle pager communication apparatus shown in FIG. 1.

Referring now to the drawing and to FIGS. 1–6, in particular there is depicted a communication apparatus which provides communication between a telephone and pager communication network and a pager based control in a vehicle to control vehicle functional circuits, such as engine starting, engine stop, door locks, air conditioning/ heater controls, etc.

Referring now to FIG. 1, there is depicted an overall pictorial representation of the communication apparatus 10 of the present invention. The communication apparatus 10 includes any touch tone telephone hand set 12. The telephone handset 12 may be hard wired to conductors forming part of a public switched telephone network 14. Any touch tone telephone handset 12 may be employed in the present invention, including cellular telephones, wireless telephones, etc. Alternately, a computer can replace the telephone 12 and can generate the call via a standard modem.

The public switched telephone network 14 may include a hard wired telephone network as well as microwave, radiovwave, etc., networks.

The pager service provider 16 is a central switching facility or pager company which receives an incoming telephone call from the telephone handset 12 over the network 14 and then broadcasts wireless communication signals via an antenna 18 within a field of service using any commercially available wireless communication FLEX, POCSAG, GSM, TDMA, CDMA, PCS or CDPD. The signals are typically transmitted at a frequency of 929 MHz to 932 MHz, by example only. Repeaters, not shown, may be employed to expand the field of service of the broadcast signal from the pager company 16 in a conventional manner.

The broadcast signal from the antenna 18 is received by pager vehicle communication apparatus (PVCA) 20 which is electrically connected to certain vehicle 22 operating circuits to control selected vehicle functions normally controlled by such circuits, as described hereafter.

Although not shown, the PVCA 20 is mounted in a housing which can be located or mounted in a suitable position within a vehicle such as within the vehicle trunk, or the interior occupant compartment of the vehicle 22. A plurality of electrical conductors arranged in two sets of conductors 24 and 26, see FIG. 2, extend from the housing of the PVCA 20 and terminate at one end in connectors which plug into electrical connectors 28 and 30, respectively, which are soldered onto a circuit board in the PVCA 20. The other ends of the sets of conductors 24 and 26 are attached to conductors connected to the vehicle operating circuits as described hereafter. This enables PVCA 20 to be easily installed into most types of vehicles 22.

As shown in FIGS. 3–6, a voltage regulator means or circuit 34 has one terminal connected to the VDIG 9–16 VDC power input from the positive terminal of the vehicle battery through the connector 30. Another terminal labeled VBAT_RTN is a power return for the PVCA 20 and is connected to the negative terminal of the vehicle battery through the connector 30.

The voltage regulator means 34 includes an adjustable micropower voltage regulator 36 sold by National Semiconductor as Model No. LP2951. The voltage regulator 36 provides a 5 volt output and has a low voltage reset. signal. The voltage regulator 36 regulates the input voltage to 5 VDC and has an error output which goes low when the input voltage falls too low for the voltage regulator 36 to maintain 5 VDC. This error output provides a reset signal (RESET) to a control unit or microcontroller 40.

At the heart of the PVCA 20 is a control means, such as a central processor unit or microcontroller 40. Although any CPU or microcontroller 40 could be employed, by way of example only, an 8 bit CMOS microcontroller sold by Microchip, as Model No. PIC16C65 is employed and shown in FIG. 4. The microcontroller 40 is a one time programmable microcontroller which is programmed during the production of the circuit board assembly of the PVCA 20. The microcontroller 20 performs all of the control and decision functions of the PVCA 20 based on a software program which is burned into the internal memory of the microcontroller 40. An external memory 42 is connected to the microcontroller 40 for storing parameters after loss of power. By example, the external memory 42 is a 1K CMOS serial EEPROM, Model No. 24LC01B by Microchip.

Various inputs are supplied to the microcontroller 40. START_IN is an input from the vehicle ignition switch. This signal is passed through a noise reduction filter 50 to supply a START_ON input signal to the microcontroller 40.

Figure 3:
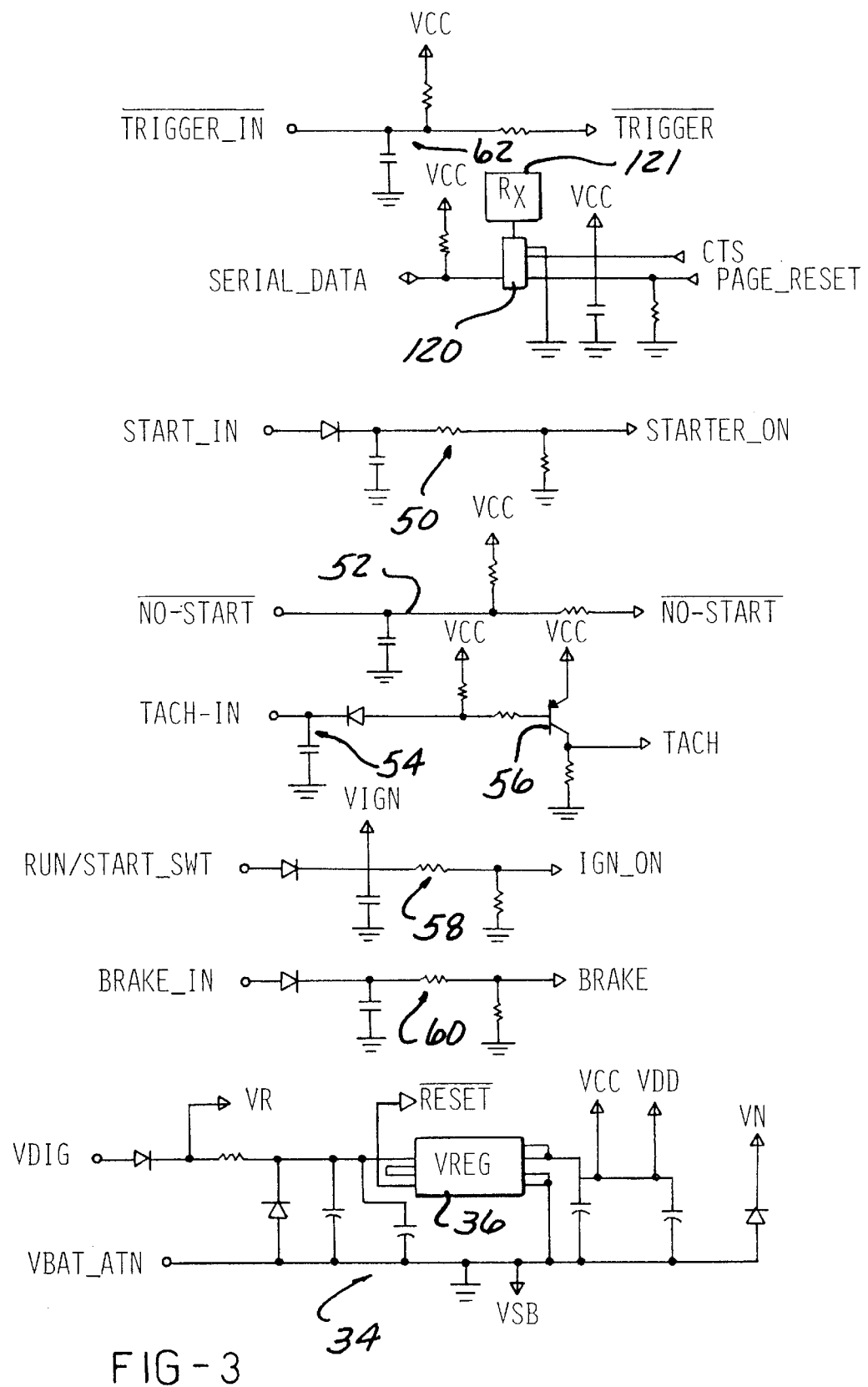
Figure 4:
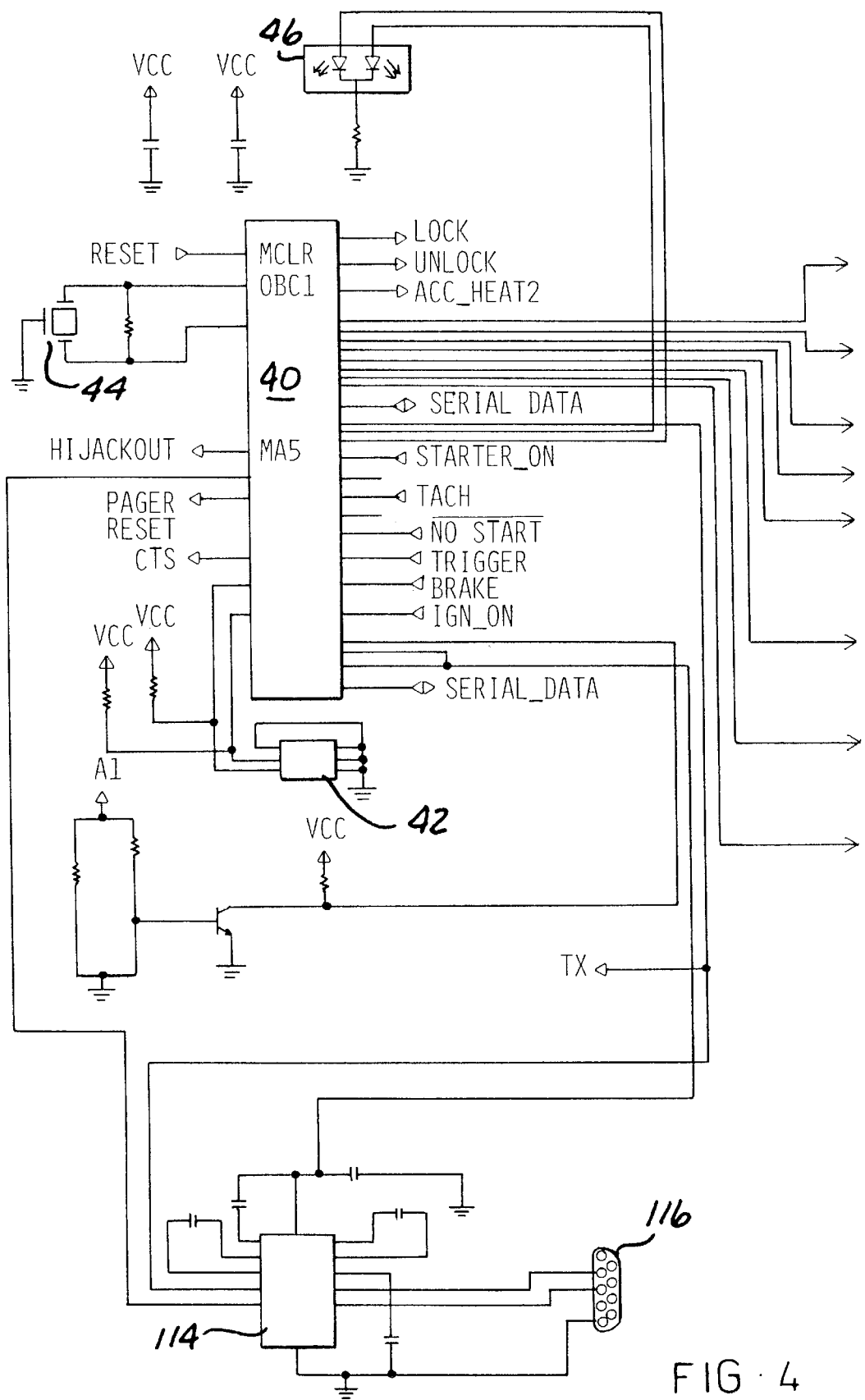

As shown in FIG. 3, $\overline{\text{NOSTART}}$ or $\overline{\text{NO-START}}$ is a signal received through the connector 30 and tells the PVCA 20 not to start the engine when commanded to do so either through the pager network or with the TRIGGER_IN command. The $\overline{\text{NOSTART}}$ signal is active low and is normally connected to a tilt switch mounted on the vehicle hood in such a way that when the hood is open, the vehicle cannot be started by the PVCA 20. This is an optional signal and is not needed for normal operation of the PVCA 20.

TACH_IN is the engine RPM input signal and can be connected to any negative going signal that represents the engine RPM. Typical locations are the negative side of the vehicle ignition coil or any of the fuel ignition relay coil wires. The TACH_IN signal is connected through a filter 54 to a transistor 56. The output of the transistor 56 is a TACH signal to the microcontroller 40.

The RUN/START_SWT signal is an ignition key switch input. This signal is coupled to a filter 58 and generates a IGN_ON input signal to the microcontroller 40.

BRAKE_IN is a brake pedal pressed positive input signal which is used as one of the conditions to go into the learn mode described hereafter, and is used to immediately stop the engine and take the PVCA 20 out of the start engine mode. This signal is normally connected to the brake pedal pressed sensor output (brake light signal) located near the brake pedal in the vehicle 22. The BRAKE_IN signal is passed through a filter 60 to generate a BRAKE input signal to the microcontroller 40.

TRIGGER_IN is an active low input signal to the PVCA 20 which is used to command the PVCA 20 to go into the start engine mode by an external device, such as a vehicle car alarm. This signal would be connected to the auxiliary or trunk release wire from an alarm or keyless entry system. This signal is an optional signal and is not needed for normal operation of the PVCA 20. The TRIGGER_IN signal passes through a filter 62 and generates a TRIGGER input signal to the microcontroller 40.

Figure 5:
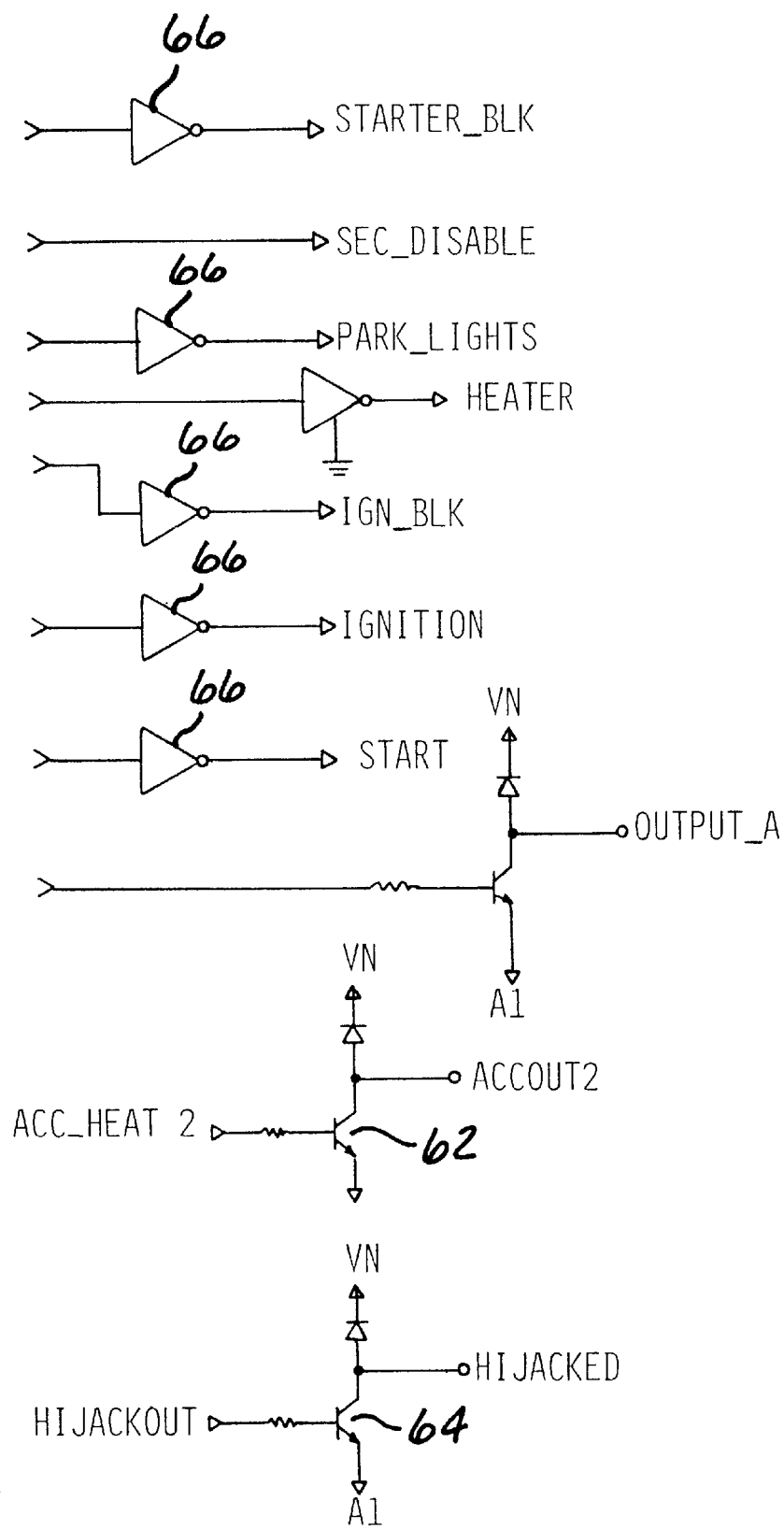
Figure 6:
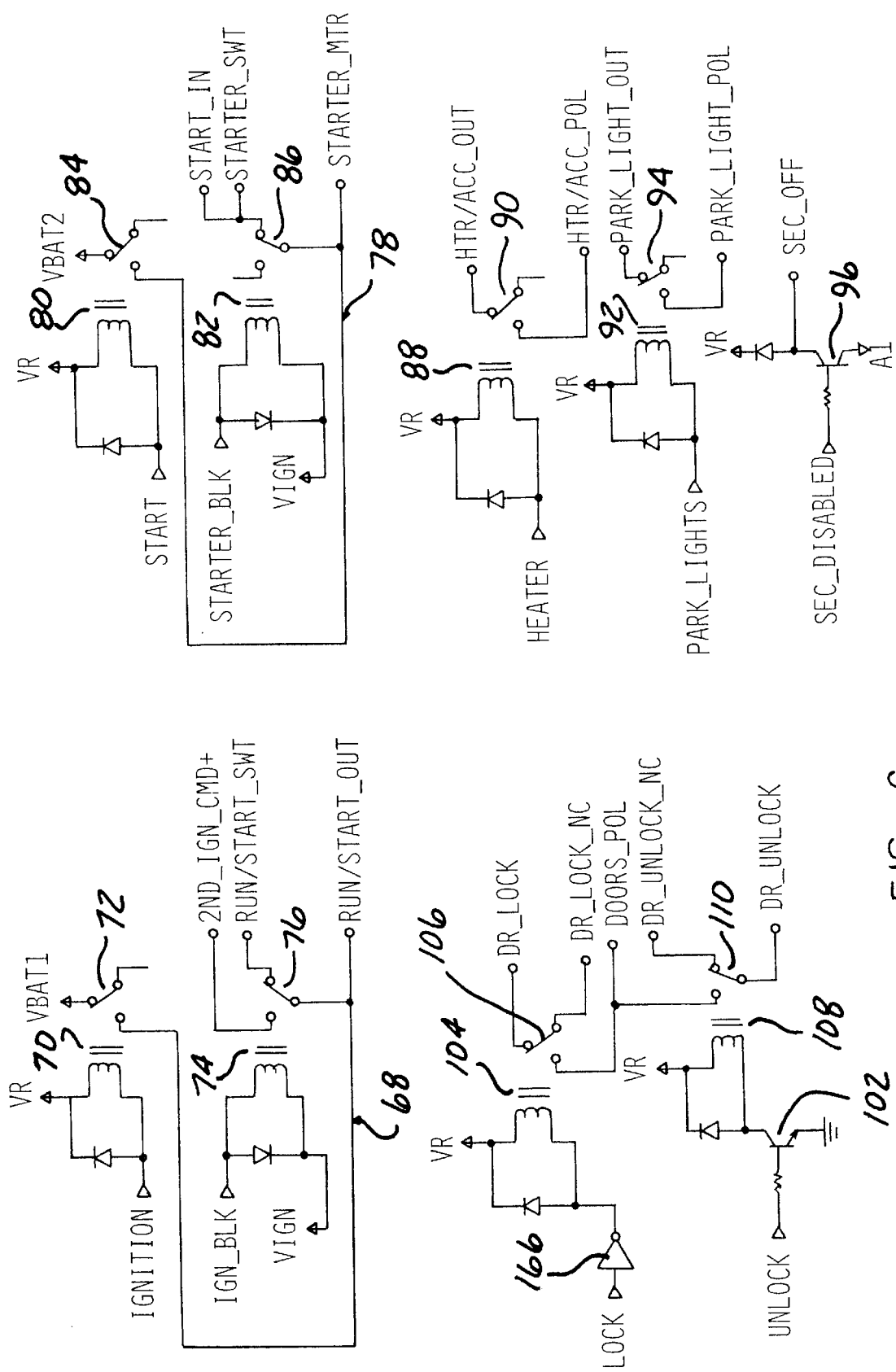

The microcontroller 40 generates a plurality of outputs which are used to control various vehicle functions or circuits. As shown in FIGS. 5 and 6, one output from microcontroller 40 is connected to a transistor amplifier 62, the output of which is labeled ACCOUT2. This output is used to energize a secondary accessory system on vehicles having two accessory busses. This output is activated when the PVCA 20 is in the start vehicle mode and after the vehicle has a successful start. This open collector output would be connected to a relay coil, the switchable contact of which would be wired as normally opened such that energization of the coil causes the switchable contact to close battery voltage in parallel to a vehicle's secondary accessory system.

Another output of the microcontroller 40 is labeled HI_JACKOUT. This output is connected to a transistor 64, the open collector output of which is labeled HIJACKED. This output is activated when an anti-hijack command is received by the PVCA 20 and deactivated when the PVCA 20 leaves the anti-hijack mode or the engine is turned off, whichever occurs first. This is a general purpose output and can be used to turn on a siren or horn during the anti-hijack routine. However, it should be understood that this is an optional signal and is not required for operation of the anti-hijack routine.

As shown in FIG. 5, certain outputs from the microcontroller 40 are connected to a high voltage, high current Darlington transistor array 66 which is used as buffers and relay drivers between the microcontroller 40 and on-board relay coils shown in FIG. 6.

Referring now to FIG. 6, there is depicted an ignition enable and block circuit denoted generally by reference number 68. The IGNITION output from the Darlington transistor array 66 connected to the microcontroller 40 is connected to a relay coil 70 which has a switchable contact 72. The switchable contact 72 is normally open, but is switchable to VBAT1 to generate an output labeled RUN/START_OUT. The VBAT1 signal is connected to the positive terminal of the vehicle battery.

The ignition circuit 68 includes a second relay coil 74 which is energized by an IGN_BLK signal from one Darlington transistor array 66 coupled to an output of the microcontroller 40. The relay coil 74 has a switchable contact 76 which is connected to the RUN/START_OUT output at a common terminal and to switchable terminals labeled 2ND_IGN_CMD+ and from the ignition key switch a RUN/START_SWT terminal. The RUN/START_SWT signal is obtained by cutting the wire in the vehicle that is connected between the ignition key switch and the ignition bus. The RUN/START_SWT signal goes to the key switch side and the RUN/START_OUT signal goes to the ignition bus. This wire carries voltage when the ignition key is in the ON position and continues to carry voltage when a key is moved to the START position. The RUN/START_SWT signal tells the PVCA 20 that the engine is on. The PVCA 20 also uses this input along with the RUN/START_OUT signal to disable the vehicle engine from operation when the vehicle is disabled. Thus, the RUN/START_SWT and the RUN/START_OUT signals form the ignition block feature of the PVCA 20.

The 2ND_IGN_CMD+ signal is an output through the connector 30 and can be used to energize a secondary ignition system when the vehicle has two ignition busses. This signal is present when the PVCA 20 is in the start engine mode and can be used to activate an external relay which is connected in parallel with a secondary vehicle ignition system and is always at battery voltage when asserted.

FIG. 6 also depicts a starter and starter block circuit 78 which includes first and second relay coils 80 and 82, each respectively having a switchable contact 84 and 86. The first relay coil 80 is energized by a START output from the microcontroller 40. Activation of the first relay coil 80 causes the contact 84 to switch positions and connect high current from the positive terminal of the vehicle battery (labeled VBAT2) to an output signal labeled STARTER_MTR. The STARTER_MTR signal and a STARTER_SWT signal are obtained by cutting the wire running from the vehicle ignition or key switch to the starter relay. The STARTER_SWT signal then goes to the key switch side and the STARTER_MTR signal goes to the starter motor relay side. These wires carry voltage when the ignition key is in the START position, but not in any other key position. During the learn mode, the PVCA 20 interprets the STARTER_SWT signal as an indication that the starter motor is on. The PVCA 20 also uses this input along with the STARTER_MTR output to disable the vehicle from starting when the vehicle is disabled. Thus, the STARTER_SWT and STARTER_MTR signals form the starter block feature of the PVCA 20.

The STARTER_BLK output from the microcontroller 40 is connected to the second relay coil 82. The switchable contact 86 controlled by the second relay coil 82 is connected between the STARTER_MTR output and parallel signals labeled START_IN and STARTER_SWT.

As also shown in FIG. 6, the PVCA 20 through the microcontroller 40 is capable of controlling separate vehicle operating circuits or functions, such as the vehicle heater, parking lights as well as disabling a vehicle security alarm system.

As shown in FIG. 6, a HEATER output signal from one of the Darlington transistor arrays 66 coupled to an output of the microcontroller 40 energizes a relay coil 88 which causes a switchable contact 90 of the relay coil 88 to switch and make an electrical connection between a heater/accessory output labeled HTR/ACC_OUT and a heater/accessory polarity conductor labeled HTR/ACC_POL. The HTR/ACC_OUT signal and the HTR/ACC_POL signals are connected through connector 28 to the primary vehicle accessory bus. The HTR/ACC_OUT signal is used to power the vehicle accessory bus after the engine is started by the PVCA 20. This signal is activated after the vehicle engine is running and is deactivated when the engine is turned off or the PVCA 20 exits the start vehicle routine. This output therefore indirectly turns on the vehicle heating or air conditioning system if the system was left on by the user when last exiting the vehicle. This output also is connected directly in parallel with the vehicle accessory bus which registers voltage when the ignition key is in the ON position; but not in the ACCESSORY position. The voltage drops when the ignition key is turned to the START position.

An output labeled PARK_LIGHTS from the microcontroller 40 through a Darlington transistor array 66 is connected to relay coil 92 which controls a switchable contact 94. The switchable contact 94, when switched to the closed position upon energization of the relay coil 92, connects a conductor labeled PARK_LIGHT_OUT to a conductor labeled PARK_LIGHT_POL. The parking light polarity and parking light outputs are used to turn on the vehicle parking lights and are used for visual feedback of the status of the PVCA 20 under certain operating conditions. The PARK_LIGHT_OUT signal is connected to the vehicle parking lights. The PARK_LIGHT_POL signal or conductor is connected to either battery positive or battery ground depending upon the polarity necessary to turn on the vehicle parking lights. For most vehicles, this polarity signal is connected to the positive terminal of the battery.

An output signal from the microcontroller 40 labeled SEC_DISABLE is connected to the base of transistor 96. This signal is used to deactivate or bypass either a factory installed security system or an after market alarm system. This signal has two modes of operation and are changeable when the unit is in the learn mode via the telephone. Mode 1 is the default mode and is shipped from the factory in this mode, Mode 1 produces a ½ second pulsed low output SEC_OUT when the PVCA 20 is put into the start engine mode or when the door unlock command is received. In this mode the transistor 96 output SEC_OUT is normally connected directly to the security system input. This provides a means to deactivate the security system when the engine is started or the unlock command is given to the vehicle.

Mode 2 produces a constant low signal at the SEC_OUT output when the PVCA 20 is in the start engine mode only. No change is made when the unlock command is given. The signal would be used to command an external relay which is wired in the normally closed contact. During the start/ running routine, the relay contacts would open, thus providing a means to disable a shock sensor from tripping the after market alarm system.

As also shown in FIG. 6, the microcontroller 40 generates outputs labeled LOCK and UNLOCK which are respectively connected to an inverter 66 and transistor 102. Inverter 66, when in a conducting state by the presence of a LOCK output from the microcontroller 40, energizes relay coil 104 which causes switchable contact 106 to switch positions. The contact 106 is normally connected in a closed position between conductors or signals labeled DR_LOCK and DR_LOCK_NC. A DOORS_POL signal is also provided for door lock and unlock commands. The manner in which the DOORS_POL signal or conductor is connected depends on the vehicle. For vehicles with positive electrical commands, this conductor is connected to the vehicle +12 bus. For vehicles with negative commands, this conductor is connected to ground. Again, how the DR_LOCK and DR_LOCK_NC signals are connected depends on the vehicle. For vehicles with relays, the DR_LOCK_NC signal is not used. The DR_LOCK conductor is connected to activate the vehicle's door lock relay. For vehicles without relays, both signals are used. In this type of vehicle, the DR_LOCK and DR_LOCK_NC connections are connected in series with the wire that runs from the lock switch to the lock motor. Thus, when the relay coil 104 is energized by a LOCK output from the microcontroller 40, an output signal on conductor DR_LOCK is generated and supplied through connector 30 to the door lock motor.

A similar circuit is provided to unlock the doors. An UNLOCK output from the microcontroller 40 is connected through transistor 102 to energize a relay coil 108. The relay coil 108 controls a switchable contact 110 which is connected between conductors labeled DR_UNLOCK_NC and DR_UNLOCK. These signals are connected in the same manner as the lock signals for vehicles with or without relays. Thus, when energized by an UNLOCK signal from the microcontroller 40, the relay coil 108 is energized and switches contact 110 to a position providing a positive output on conductor DR_LOCK through connector 30 to the door unlock motor.

Referring again to FIG. 4, a voltage level converter 114 has inputs connected to outputs of the microcontroller 40. The outputs of the voltage level converter 114 are connected to a connector 116 to provide electrical communication with external devices, such as the serial port of a computer, not shown.

The voltage level converter 114 is preferably a +/−15 kV, ESD-protected +5 V RS-232 transceiver integrated circuit sold by Maxim, model No. MAX202. This transceiver converts +5 volts to RS-232 voltage levels and vice versa to enable the PVCA 20 to communicate with external devices through the connector 116.

Reference number 120 depicts a 10 pin connector, which connects CTS, PAGER-RESET and SERIAL DATA signals to the microcontroller 40 from a pager receiver 121, such as a Motorola FLEX datalink messaging pager receiver, Model No. J38DNW0050AE.

The PVCA 20 is capable of receiving a variety of commands and then taking action to energize an appropriate output to stop or start the engine, to enter the anti-hijack mode, to cancel the anti-hijack mode, to lock and unlock the doors, as well as to program a new pin number. The various commands and their formats are as follows:

START ENGINE:
    <phone number><pin number><START>
STOP ENGINE:
    <phone number><pin number><STOP>
ANTI HIJACK COMMAND:
    <phone number><pin number><HIJACK>
CANCEL ANTI HIJACK and/or ENABLE ENGINE:
    <phone number><pin number><OK>
UNLOCK DOORS:
    <phone number><pin number><UNLOCK>
LOCK DOORS:
    <phone number><pin number><LOCK>
STOP ENGINE (while in hijack mode):
    <phone number><pin number><DONE>
PROGRAM NEW PIN NUMBER:
    <phone number><old pin number><new pin number><new pin number>

In order to program a new pin number, the ignition key of the vehicle must be in the ignition and moved to the ON position. The engine must be off. When the new pin number has been programmed into the PVCA 20, the vehicle parking lights will flash 5 times if the new pin is accepted, and will flash once if not accepted. If the new pin number is not accepted, then the new pin number will not be programmed into the PVCA 20 and the old pin number will have to be used.

In order to send any command to a vehicle, the user must perform the following procedure:

1. Dial the phone number of the PVCA 20 in the vehicle,
2. After beeps are heard, type in the pin number and then the desired command, as described above, and
3. Hang up the phone.

0 to 120 seconds later, for example, the pager provider 16 will transmit the user generated command to the PVCA 20 in the vehicle 22. The pager service provider 16 transmits a pager ID, the security code and the command. The PVCA 20 will recognize its preprogrammed pager ID and accept and decode the security code and command. The security code is checked with the learned pin number.

The PVCA 20 includes in its control program stored in memory, several operating modes or subroutines referred to as Learn Mode, Learn Start Mode, Start Engine Mode, Stop Engine Mode and Anti-Hijacked Mode.

Figure 7A:
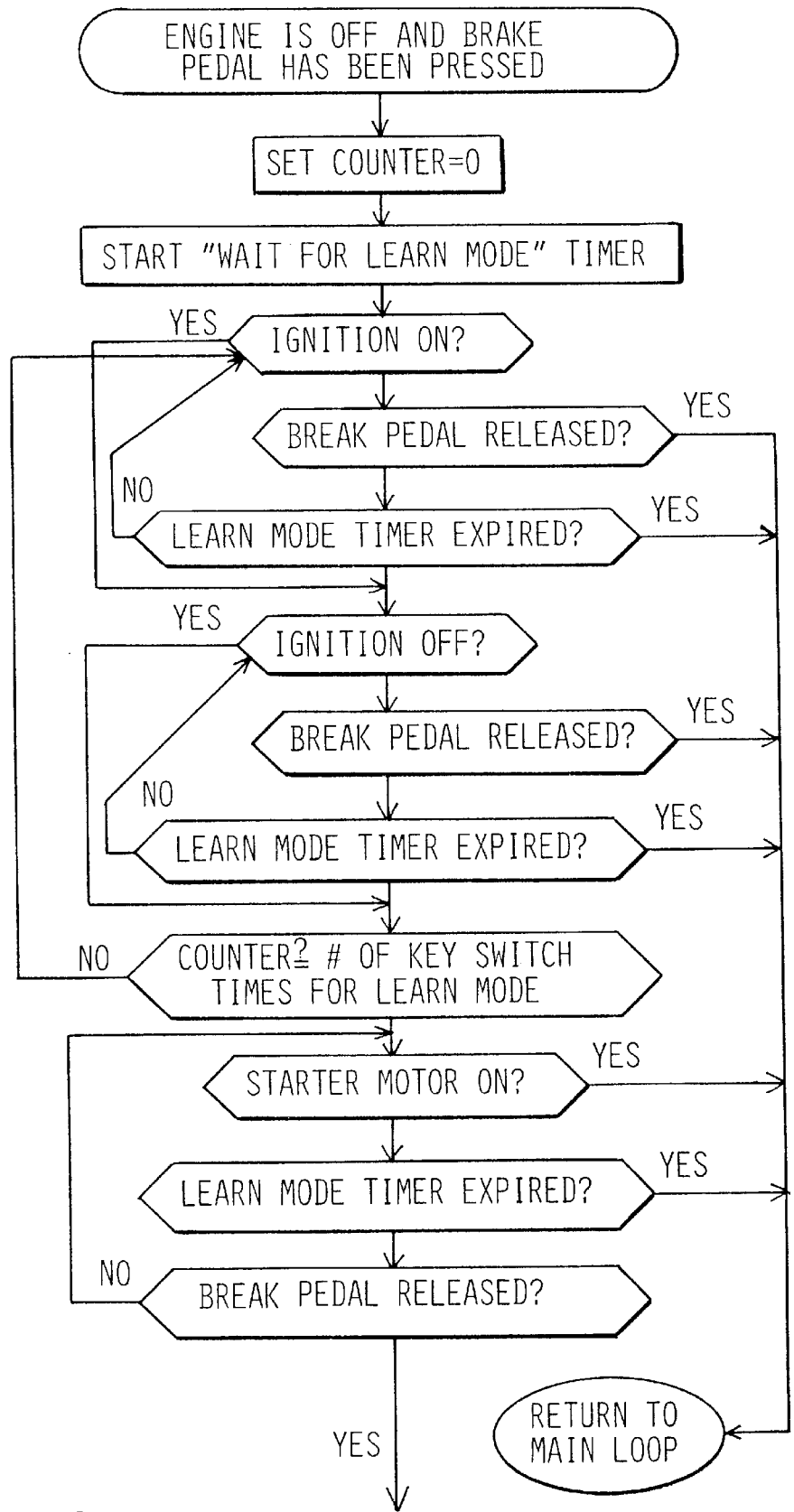
FIGS. 7A–7C are flow diagrams depicting the program sequence of the learn mode of operation of the pager vehicle communication apparatus of the present invention.
Figure 7B:
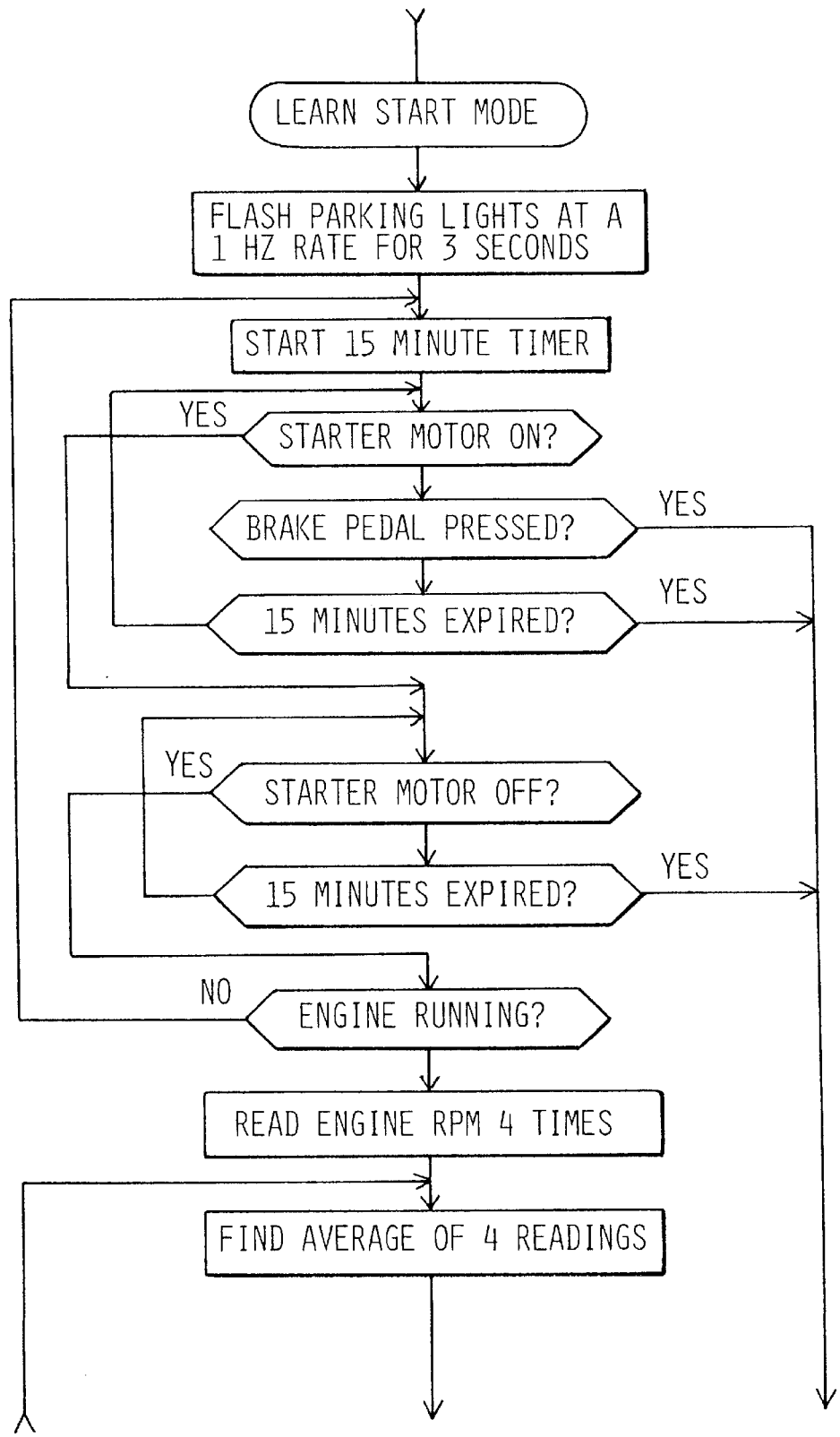
Figure 7C:
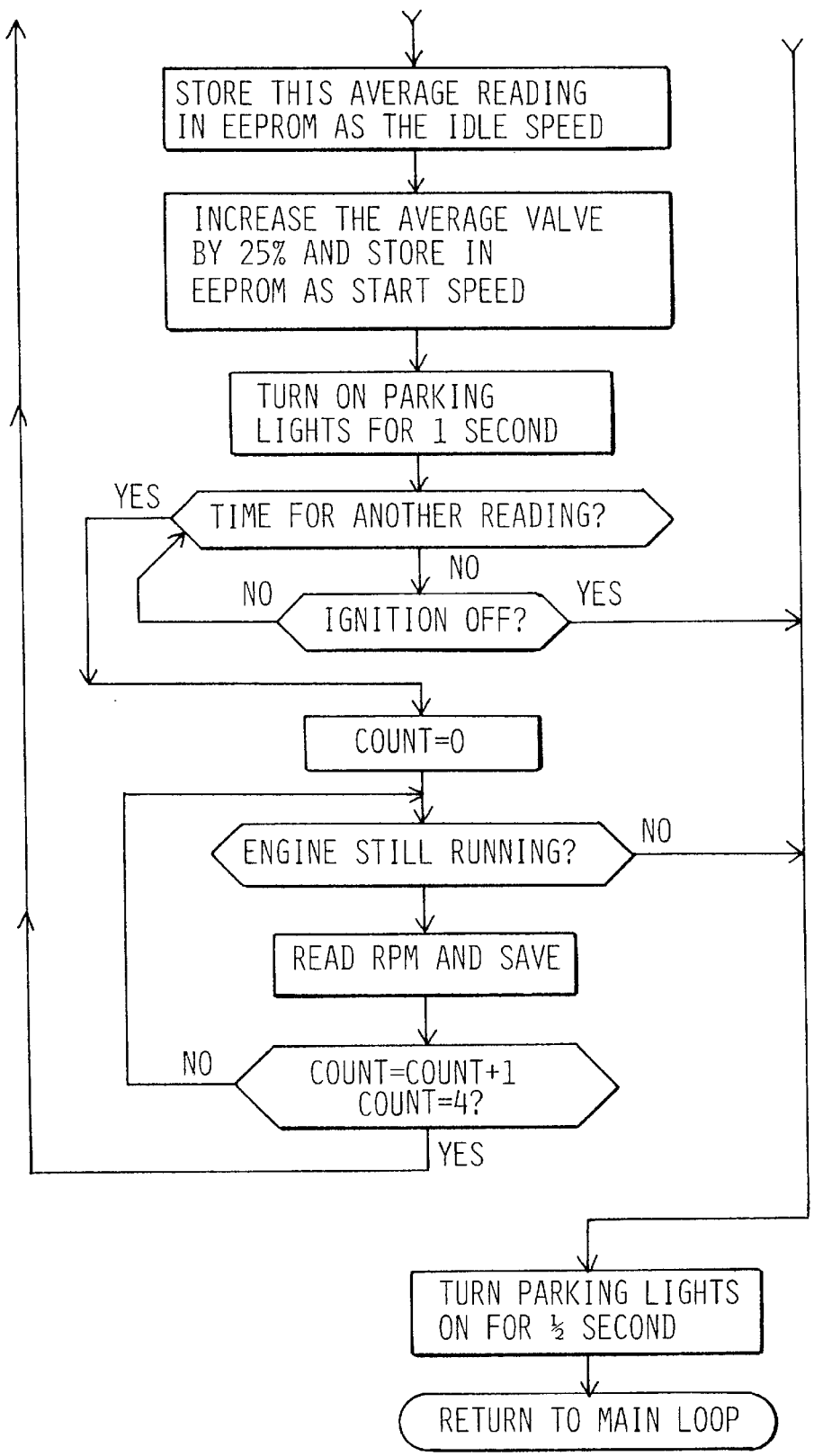
Figure 8A:
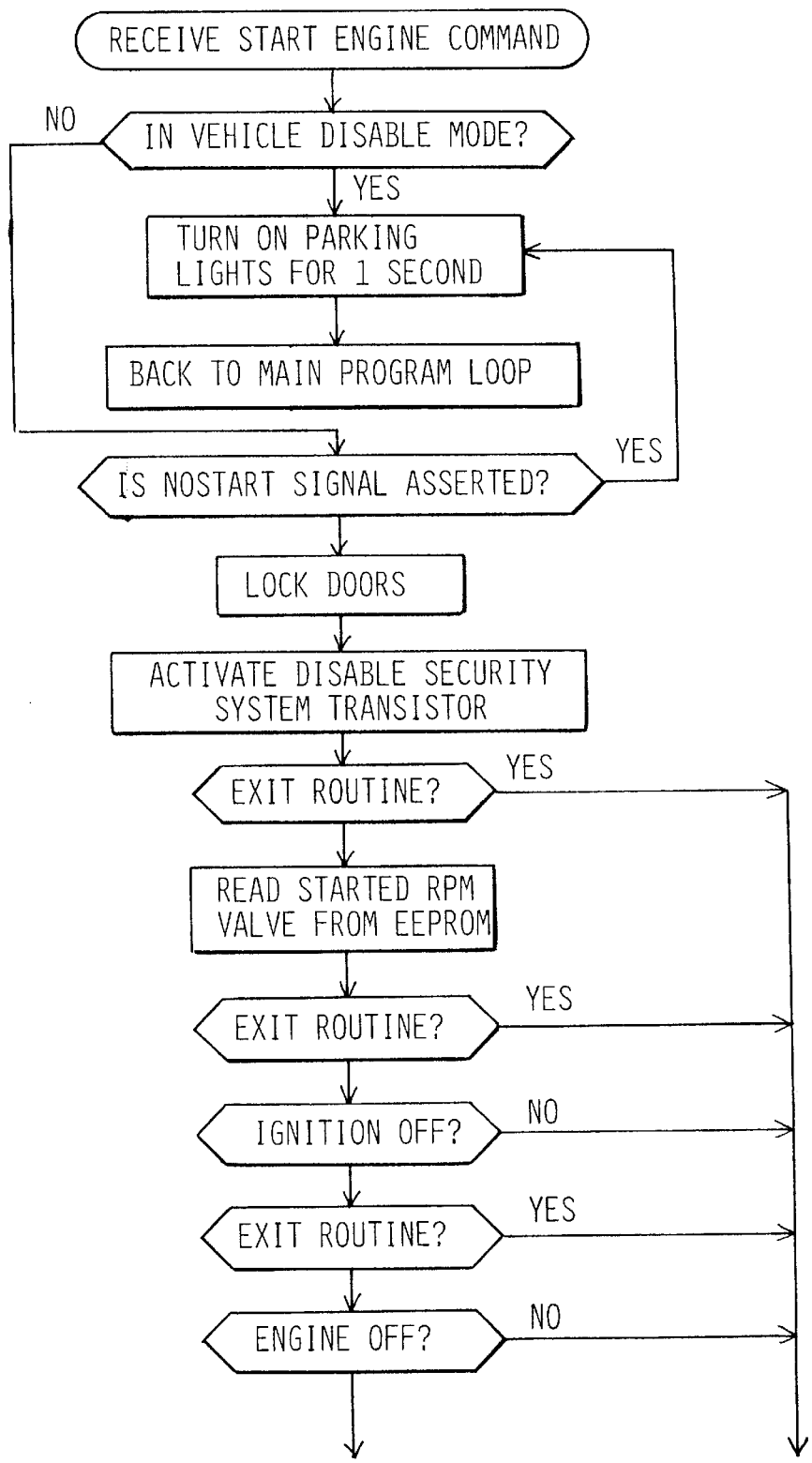
FIGS. 8A–8E are flow diagrams depicting the engine start and stop command program sequences.
Figure 8B:
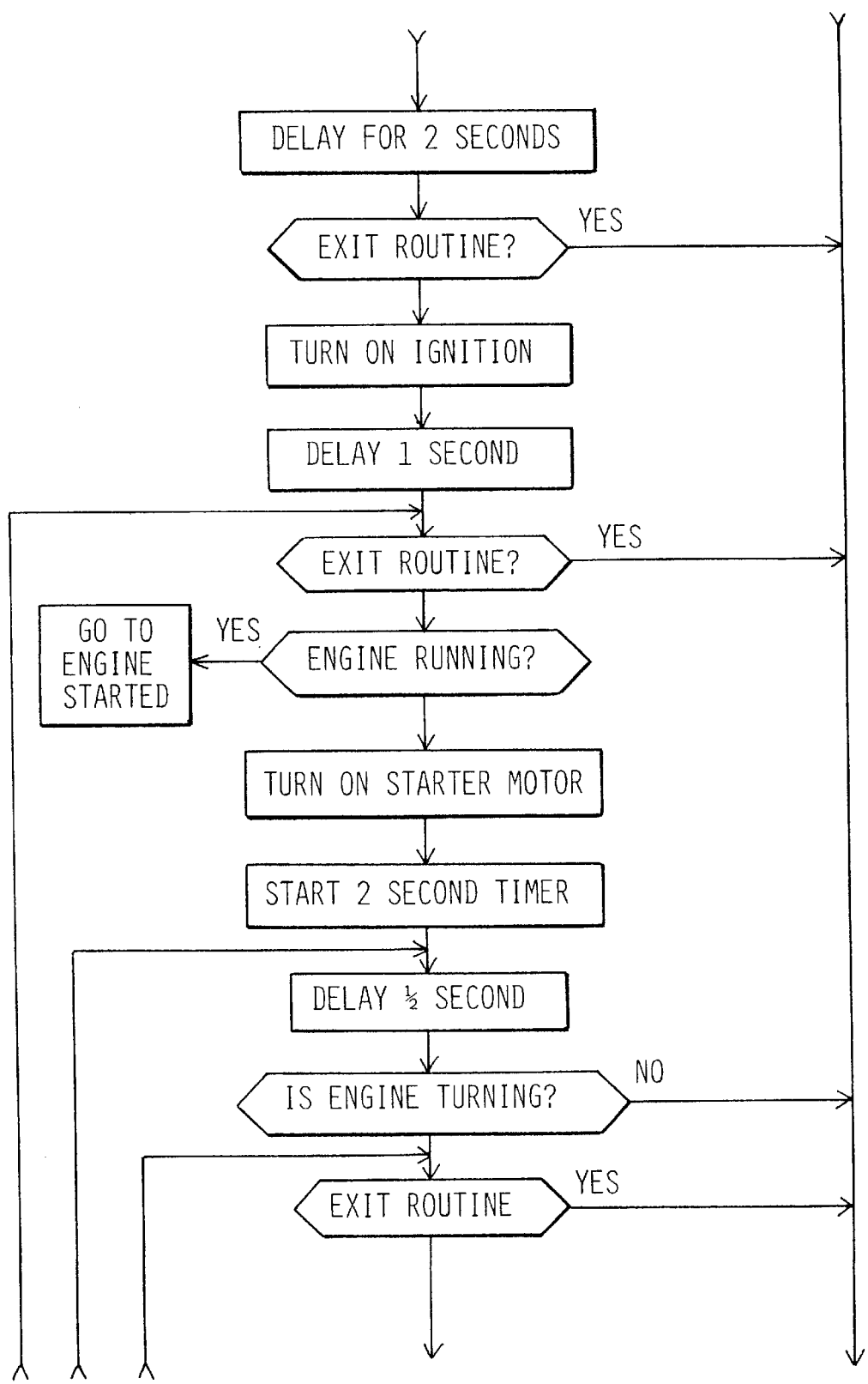
Figure 8C:
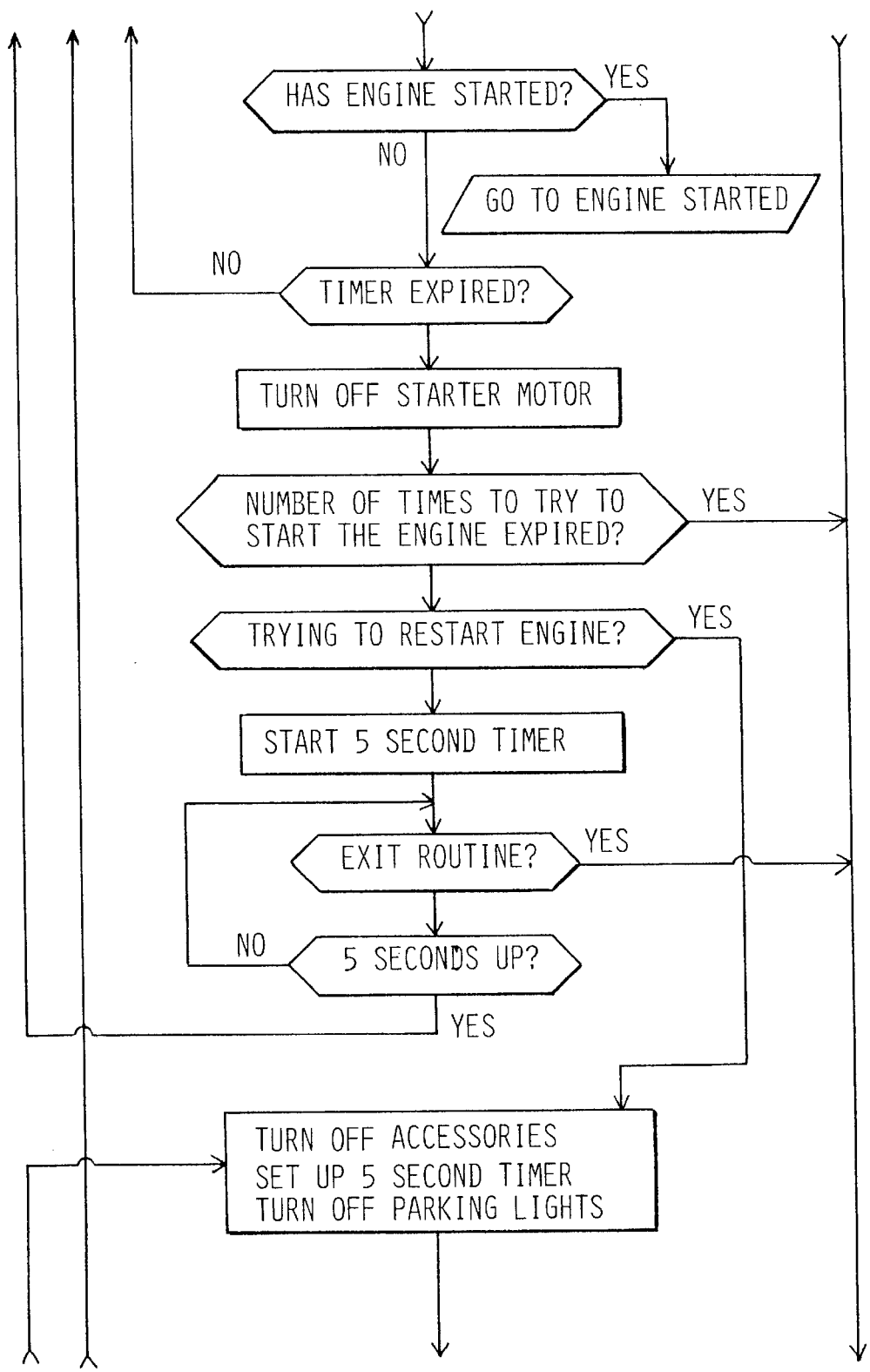
Figure 8D:
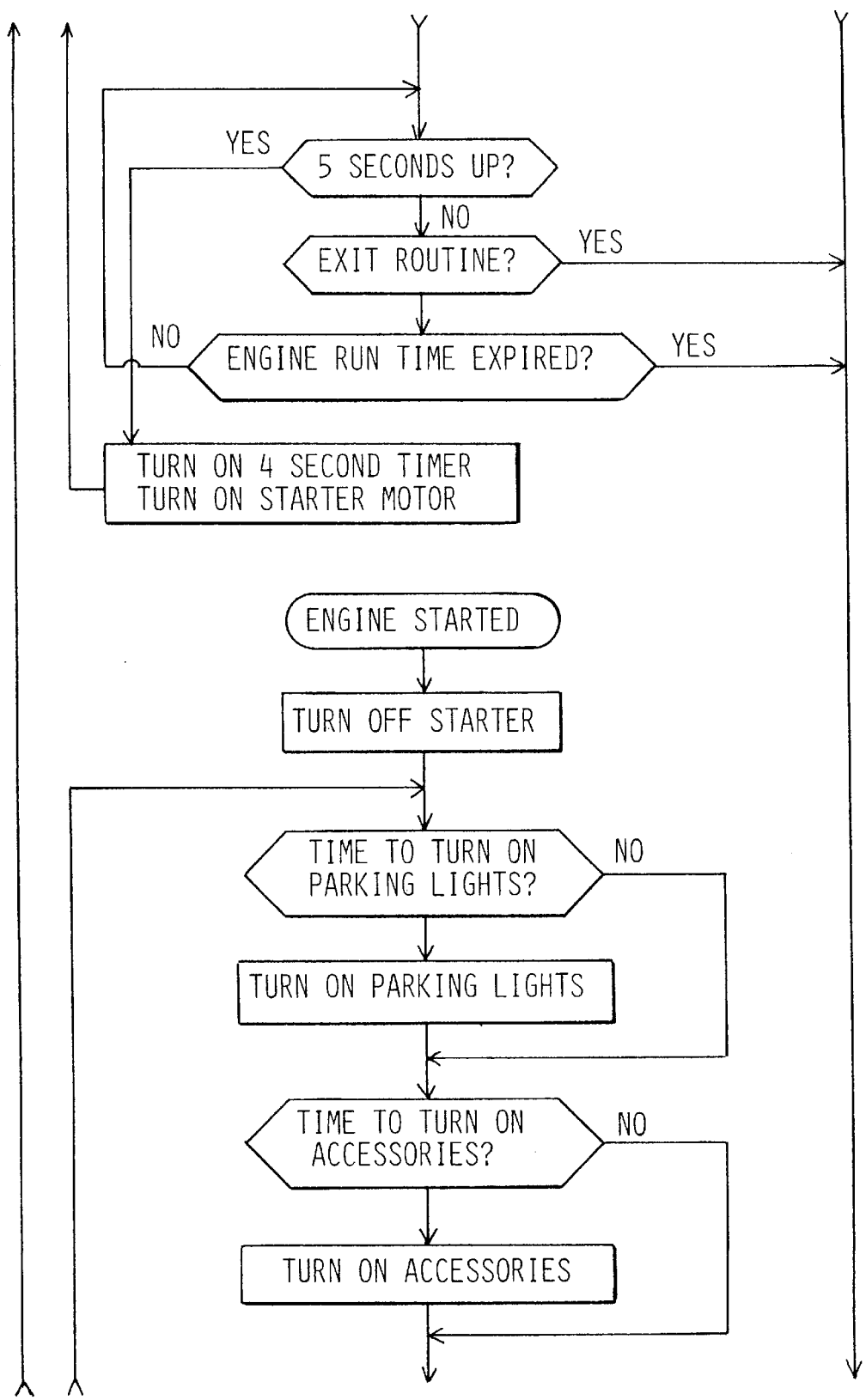
Figure 8E:
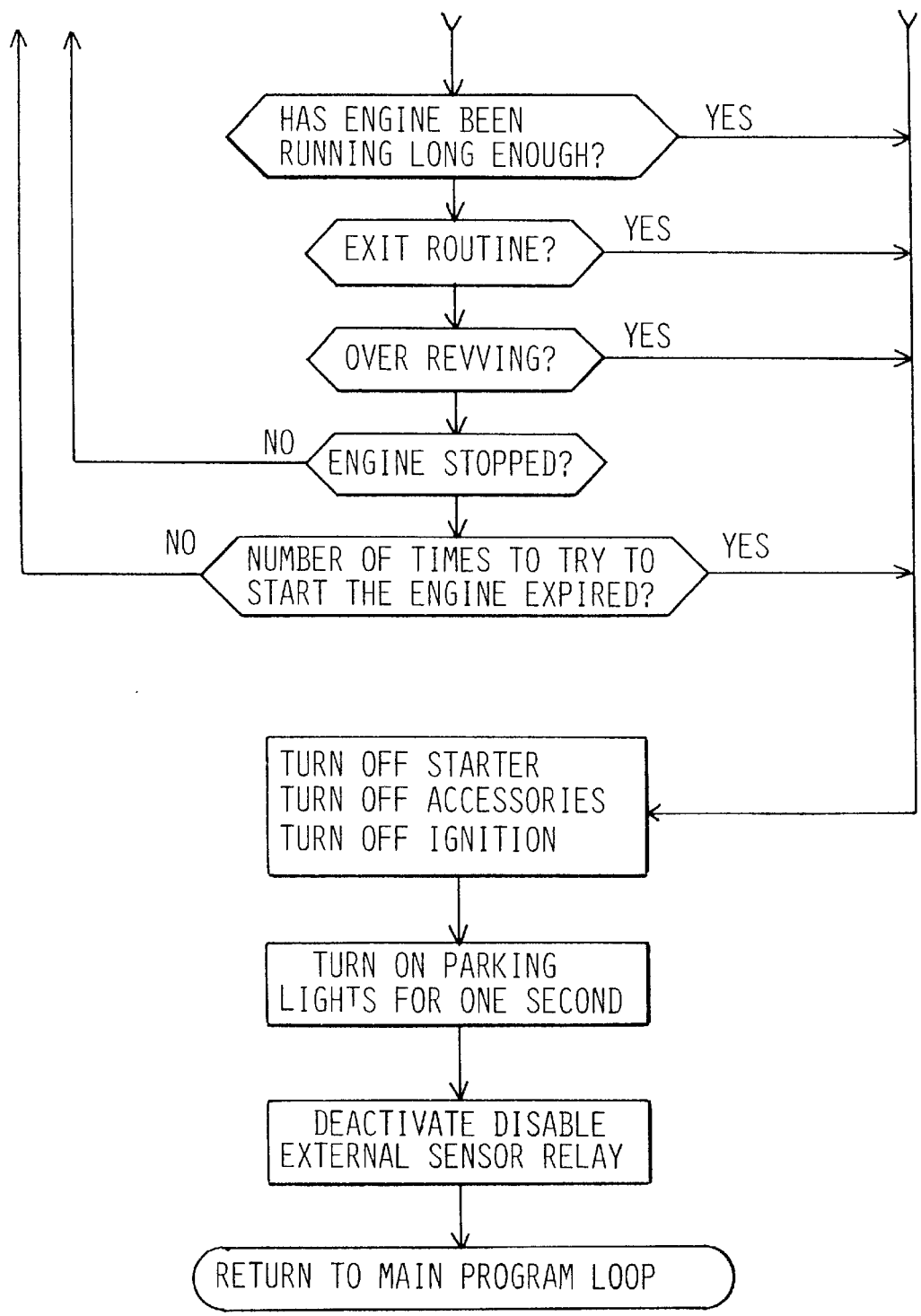

As shown in FIGS. 7A–7C, the Learn Mode routine is initiated when the engine is off and the brake pedal in the vehicle has been pressed. A counter is set to "0" and a "Wait for Learn Mode" timer is started and provides a predetermined Learn Mode maximum completion time.

Next, the PVCA 20 sequences through a series of steps to determine whether the ignition switch has been turned on while the brake pedal is maintained in a depressed position. Upon detecting movement of the ignition switch to the ON position, the PVCA 20 then executes a subroutine to determine when the ignition switch has been turned OFF (while the brake pedal is still depressed). Upon receiving the next switching of the ignition switch to the OFF position, the set counter is checked with the prestored number of key switch cycle times i.e., five for example to enter the Learn Mode. If the set counter does not equal the prestored number of times, the counter is advanced by one and the ignition ON/ignition OFF sequence is repeated.

When the set counter equals the prestored number of ignition key switch cycle times to enter the learn mode, the PVCA 20 checks to see if the starter motor is OFF and that the brake pedal has been released from the depressed state. When these two events occur and the Learn Mode timer has not expired, the PVCA 20 enters the Learn Start mode.

As shown in FIGS. 7B and 7C, in the Learn Start mode, the PVCA 20 generates an output signal to flash the vehicle parking lights at a 1 Hz rate for 3 seconds. Next, a 15 minute timer is started. The PVCA 20 then checks to see if the starter motor has been turned ON within the 15; minute period, or if the brake pedal has been depressed. If the PVCA 20 determines that the starter motor has been turned ON and OFF and the engine is running within the set 15 minute time period, the PVCA 20 reads the engine RPM four times, and then calculates the average of the four RPM readings. This average is stored in memory as the engine idle RPM and is used during the anti-hijack mode described later. This average RPM value is reduced by a preset amount, such as 25%, and stored in the EEPROM 42 as the started engine RPM. This lower RPM reduces starter grinding since the starter motor is de-energized earlier in each engine start sequence.

In determining the average RPM, the PVCA 20 turns on the vehicle parking lights for 1 second and checks to see if it is time for another RPM reading. If it is time for another reading, i.e., 10 seconds have elapsed since the last reading, a counter is set to zero and the engine running or off condition is checked. If the engine is still running, the PVCA 20 reads the RPM and saves it in the RAM. The counter is then indexed by one and compared with a prestored value of 4. When the counter output equals 4, the PVCA 20 then calculates the average of the four consecutive RPM readings as described above. When the ignition is turned off, the learn mode is exited.

FIGS. 8A–8E depict the START ENGINE sequence. Upon receiving an engine start command from the pager provider 16 as described above, the PVCA 20 checks to see if the vehicle is in the DISABLE mode. If not, and a NOSTART signal has not been asserted, the PVCA 20 locks the doors and generates an output asserting the transistor 96, FIG. 8A, to deactivate any security system which may be employed on the vehicle.

The PVCA 20 then reads the started RPM value from the EEPROM 42. The PVCA 20 then, assuming that the ignition and engine are OFF, executes a two second delay and then turns ON the vehicle ignition. After another delay of one second, the PVCA 20 checks to see if the engine is running. If not, the PVCA 20 turns on the starter motor by generating a START signal to relay 80 in FIGS. 8C and 8D and activates a two second internal timer. After another ½ second delay, the PVCA 20 checks to see if the engine is started. If yes, the PVCA 20 executes an "engine started" sequence and turns off the starter motor and then checks to see if it is time to turn on the parking lights and the accessories.

If the engine has not started and the two second timer has expired, then the starter motor is turned off. The PVCA 20 will then check to determine if the maximum number of times to try to start the engine has been reached. If yes, the starter motor, accessories and ignition are turned off, the parking lights are turned on for one second, the disable security system transistor 96 is deactivated and control is returned back to the main loop.

If no, the PVCA then checks if this is a restart of a recently started engine. If it is not a restart, the control routine delays five seconds then tries to start the engine as described above. If it is a restart, then the accessories and parking lights are turned off and a five second timer is set up. The PVCA 20 then delays five seconds or until the engine run time has expired, whichever occurs first. If the engine run time has expired, then the START ENGINE sequence is exited by turning off the starter motor, accessories, and ignition. The parking lights are turned on for one second, the transistor 96 is biased off by deactivating the SEC_DISABLE signal and control is returned to the main loop. If the five second timer times out first then a four second timer is set up and the PVCA 20 tries to restart the engine as described above but uses a four second timer instead of a two second timer.

As described above, if the engine is started, the PVCA 20 executes an ENGINE STARTED sequence. After the starter motor has been turned off and the parking lights and accessories have been turned on, the PVCA 20 checks if the engine has been running long enough, for example, 15 minutes. If not, then the PVCA 20 checks if the engine is operating too fast. If it is, then the START ENGINE sequence is exited and control is returned back to the main loop as described above. If the engine is not over revving, then an engine stop condition is checked. If the engine is not stopped, then the PVCA 20 repeats the ENGINE STARTED loop. If the engine has stalled, then the PVCA 20 checks to see if the maximum number of times to restart the engine has been reached. If yes, then the START ENGINE sequence is exited and control is returned back to the main loop as described above. If no, then the accessories and parking lights are turned off and a five second timer is set up. The control routine then continues as described above.

Figure 9A:
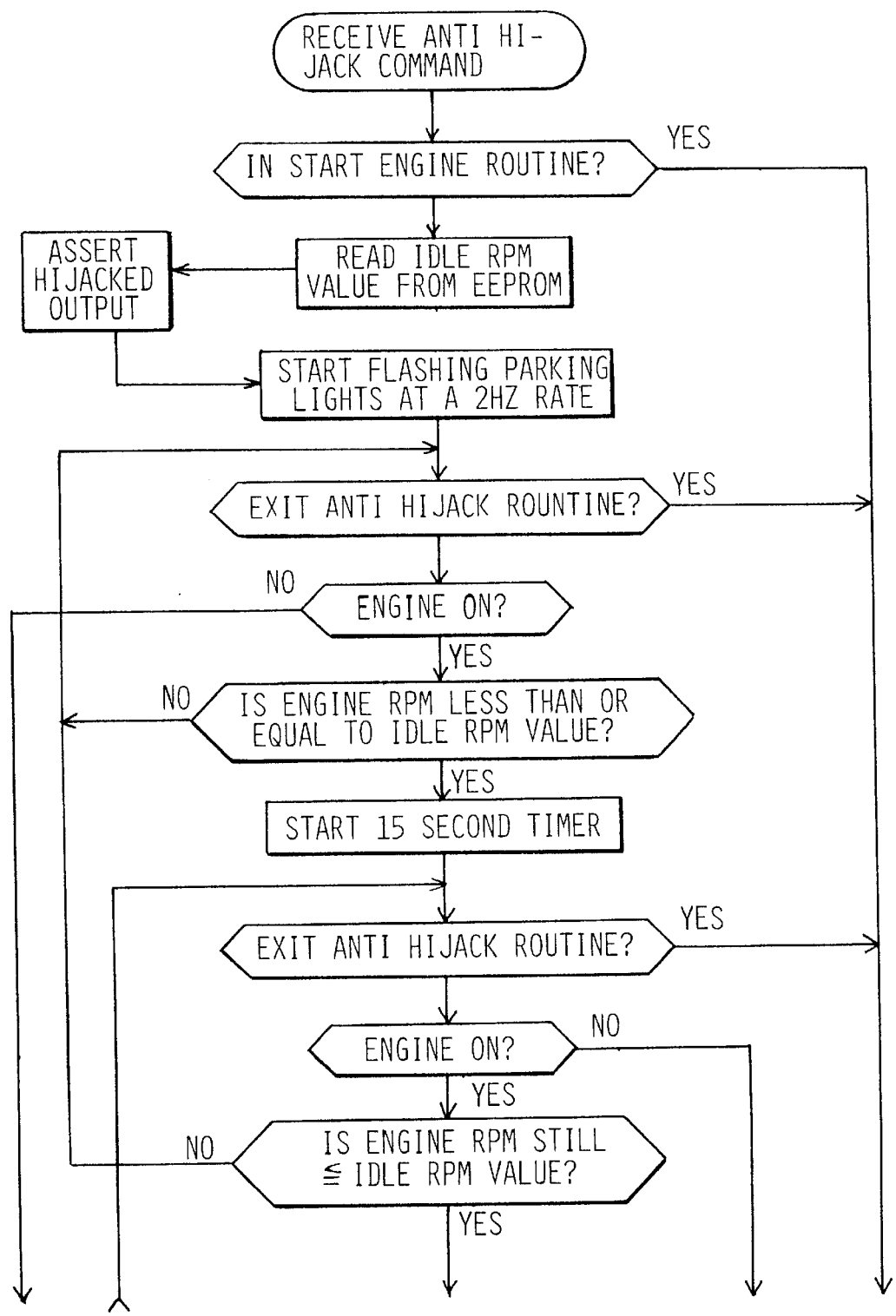
FIGS. 9A and 9B are flow diagrams depicting the hijack program command sequence.
Figure 9B:
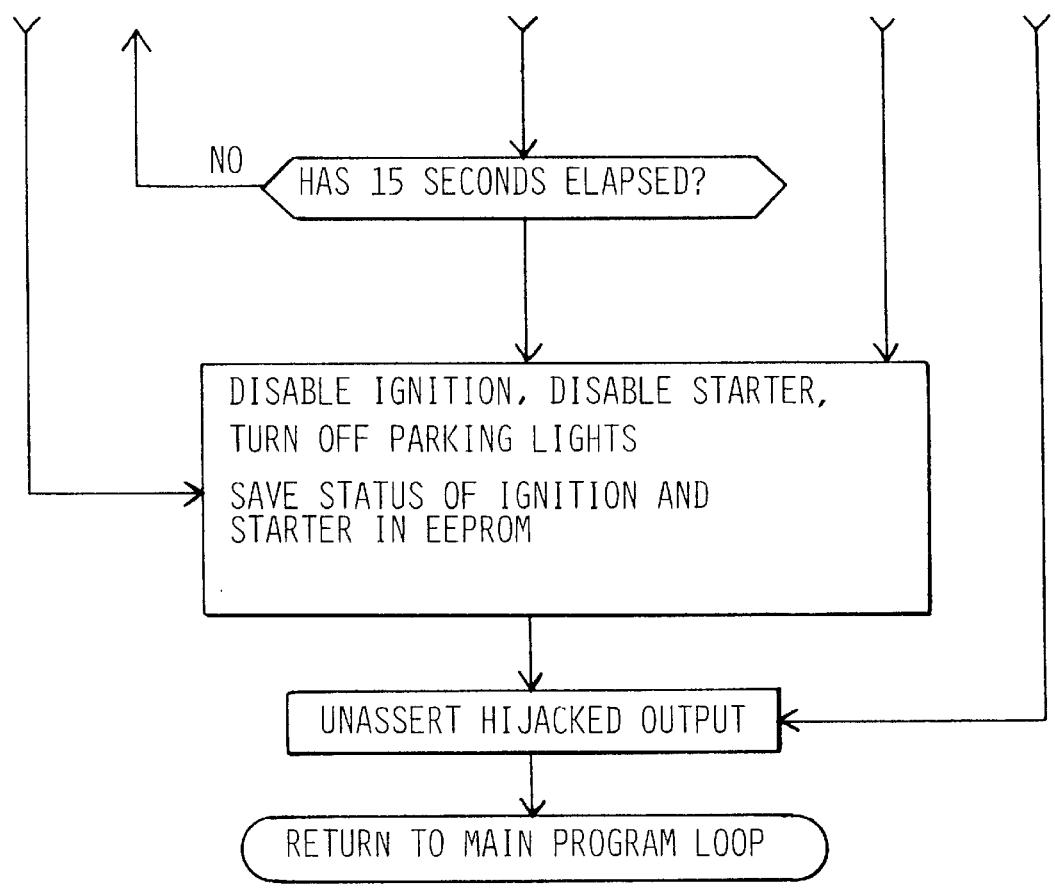

One of the key features of the PVCA 20 of the present invention is the ability to enter an anti-hijacking mode which will stop the engine once the engine speed has been reduced to a minimal amount, i.e., engine idle RPM. As shown in FIGS. 9A–9B, upon receiving a proper anti-hijack command from the pager provider 16 as described above, the PVCA 20 checks to see if operation is in the START ENGINE mode. If not, the idle RPM value is read from the memory and the HIJACKED output is asserted. The parking lights then start flashing at a 2 Hz rate.

If the engine is on, the PVCA 20 checks to see if the engine RPM is less than or equal to a certain RPM value. If it is, a 15 second timer is started, and the engine RPM is checked to see if it is still less than or equal to the stated RPM value, i.e., the engine idle RPM value. After completion of the 15 second time period and the engine RPM has remained less than or equal to the idle RPM value during the 15 second time period, the PVCA 20 disables the ignition and engine starter, turns off the parking lights and saves the "disable" status of the ignition and starter in the EEPROM 42. The PVCA 20 then unasserts the HIJACKED output and returns control to the main control program loop.

At any time before or, preferably after a HIJACKED command has been generated, the user can generate a "DONE" command. This causes the microcontroller 40 to immediately de-activate the ignition to stop engine operation regardless of the current engine RPM.

What is claimed is:

1. A pager vehicle communication apparatus mountable in a vehicle and responsive to commands input into a telephone and transmitted by a pager service provider, the apparatus comprising:

means, responsive to engine operation, for generating an output proportional to engine RPM;

means for receiving commands from a pager service provider generating an output containing control instructions; and control means, responsive to commands from the receiving means and to the engine RPM output, for stopping engine operation when the engine RPM drops below a preset engine average idle RPM magnitude, the control means including means for learning the engine average idle RPM.

2. The apparatus of claim 1 further comprising:

the receiver means includes a receiver adapted to be mounted in a vehicle and receiving paging signals from a pager service provider in response to user commands, the paging signals including a telephone number identifying a receiver in the vehicle and a signal specifying an operation of at least one vehicle function corresponding to a user command;

input means for generating signals representative of at least vehicle brake depression and ignition key position;

the control means executing a stored control program and responsive to the input means and the paging signals for controlling at least one vehicle function in response to a received paging signal;

means for establishing a start engine RPM, the start engine RPM being a predetermined lower percentage of an engine average idle RPM; and the control means de-activating the engine starter during an engine start when the engine RPM equals or is greater than the start engine RPM.

3. The apparatus of claim 1 wherein the control means further comprises:

means for regenerating the engine start signal to reactivate the engine starter a predetermined number of times if the engine is not running after each prior engine start signal.

4. The apparatus of claim 2 wherein:

the control means, in response to an engine start paging signal activates the engine starter to start the engine.

5. The apparatus of claim 2 wherein:

the control means is further responsive to door lock and door unlock commands transmitted by a pager service provider and received by the receiving means, for respectively locking and unlocking a vehicle door.

6. A pager vehicle communication apparatus mountable in a vehicle and responsive to commands input into a telephone and transmitted by a pager service provider, the apparatus comprising:

means, responsive to engine operation, for generating an output proportional to engine RPM;

means for receiving commands from a pager service provider generating an output containing control instructions;

control means, responsive to commands from the receiving means and to the engine RPM output, for stopping engine operation when the engine RPM drops below a preset engine average idle RPM magnitude; and means for determining engine average idle RPM for a preset time, the control means responsive to the determining means, for disabling the engine when the engine RPM is less than the engine average idle RPM for the preset time.

\* \* \* \* \*